US010381972B2

(12) United States Patent
Stapleton

(10) Patent No.: US 10,381,972 B2
(45) Date of Patent: Aug. 13, 2019

(54) PANEL MOUNTING BRACKET ASSEMBLY INCLUDING AN ADJUSTABLE HEIGHT EXTENSION DEVICE AND RELATED METHODS

(71) Applicant: Kevin Stapleton, New Braunsfels, TX (US)

(72) Inventor: Kevin Stapleton, New Braunsfels, TX (US)

( * ) Notice: Subject to any disclaimer, the term of this patent is extended or adjusted under 35 U.S.C. 154(b) by 0 days.

(21) Appl. No.: 15/797,110

(22) Filed: Oct. 30, 2017

(65) Prior Publication Data
US 2018/0054154 A1 Feb. 22, 2018

Related U.S. Application Data

(60) Continuation of application No. 15/278,544, filed on Sep. 28, 2016, now Pat. No. 9,806,667, which is a
(Continued)

(51) Int. Cl.
*H02S 20/23* (2014.01)
*F24S 25/61* (2018.01)
(Continued)

(52) U.S. Cl.
CPC ............... *H02S 20/23* (2014.12); *E04B 1/40* (2013.01); *F24S 25/61* (2018.05); *F24S 25/632* (2018.05);
(Continued)

(58) Field of Classification Search
CPC ......... Y02E 10/47; Y02E 10/50; Y02B 10/12; Y02B 10/20; H02S 20/23; H02S 20/00; H24S 25/61
(Continued)

(56) References Cited

U.S. PATENT DOCUMENTS 3,217,418 A * 11/1965 Wennerberg ........... B25H 7/005
33/543
4,718,628 A * 1/1988 Vitta ....................... E04G 25/06
248/354.3
(Continued)

OTHER PUBLICATIONS

U.S. Appl. No. 15/729,25, filed Oct. 10, 2017.

*Primary Examiner* — Brian E Glessner
*Assistant Examiner* — Daniel J Kenny
(74) *Attorney, Agent, or Firm* — Allen, Dyer, Doppelt + Gilchrist, PA

(57) ABSTRACT

A system for mounting at least one solar panel on a building may include at least one panel mounting bracket including a base to be positioned on the building, a vertical extension having a proximal end coupled to the base and a distal end vertically spaced apart from the base, and a first lateral extension carried on an exterior surface of the vertical extension. The system may further include an adjustable height extension device for the at least one panel mounting bracket including a lower portion, an upper portion carried by the lower portion to be connected with the at least one solar panel, a second lateral extension carried by the upper portion and vertically aligned with the first lateral extension, and a height adjustment screw including a head carried by the upper portion to set a vertical height of the upper portion.

26 Claims, 10 Drawing Sheets

Related U.S. Application Data division of application No. 14/918,953, filed on Oct. 21, 2015, now Pat. No. 9,484,853.

(60) Provisional application No. 62/066,486, filed on Oct. 21, 2014.

(51) Int. Cl.

| | | |
|---|---|---|
| *F24S 25/632* | (2018.01) | |
| *F24S 25/634* | (2018.01) | |
| *E04B 1/41* | (2006.01) | |
| *F24S 25/60* | (2018.01) | |
| *E04B 1/38* | (2006.01) | |

(52) U.S. Cl.
CPC ....... *F24S 25/634* (2018.05); *E04B 2001/405* (2013.01); *F24S 2025/6002* (2018.05); *Y02B 10/12* (2013.01); *Y02B 10/20* (2013.01); *Y02E 10/47* (2013.01)

(58) Field of Classification Search
USPC ............. 248/125.2, 237, 237.21, 354.3
See application file for complete search history.

(56) References Cited

U.S. PATENT DOCUMENTS

| | | | |
|---|---|---|---|
| 5,806,253 A * | 9/1998 | Nelson | ............... E04F 11/166 |
| | | | 52/179 |
| 7,780,472 B2 | 8/2010 | Lenox | |
| 7,963,074 B2 | 6/2011 | Schwarze et al. | |
| 8,813,441 B2 | 8/2014 | Rizzo | |
| 9,057,545 B2 | 6/2015 | Stapleton | |
| 9,145,685 B2 | 9/2015 | Stapleton | |
| 9,175,704 B2 | 11/2015 | Park | |
| 9,214,891 B2 * | 12/2015 | Dickey | ............... H02S 20/24 |
| 9,397,605 B2 | 7/2016 | Stapleton | |
| 9,484,853 B2 | 11/2016 | Stapleton | |
| 9,628,018 B2 | 4/2017 | Stapleton | |
| 2013/0048816 A1 | 2/2013 | Wentworth et al. | |
| 2015/0113889 A1 | 4/2015 | Stapleton | |
| 2015/0288320 A1 | 10/2015 | Stearns et al. | |
| 2016/0069592 A1 | 3/2016 | Giraudo et al. | |
| 2016/0111999 A1 | 4/2016 | Stapleton | |

\* cited by examiner

PANEL MOUNTING BRACKET ASSEMBLY INCLUDING AN ADJUSTABLE HEIGHT EXTENSION DEVICE AND RELATED METHODS

RELATED APPLICATIONS

This application is a continuation of U.S. patent application Ser. No. 15/278,544 filed Sep. 28, 2016, which is a divisional of U.S. patent application Ser. No. 14/918,953 filed on Oct. 21, 2015, which claims the benefit of provisional application No. 62/066,486 filed Oct. 21, 2014, the disclosures of which are hereby incorporated herein by reference in their entireties.

TECHNICAL FIELD

The present disclosure generally relates to mounting fixtures, and, more particularly, to mounting fixtures or brackets for rooftop panel installations, such as for solar panels, for example.

BACKGROUND

Solar panels, such as photovoltaic (PV) and solar water heating panels, are frequently used to take advantage of electrical power generation and heating properties of sunlight. To provide space savings and potentially enhanced efficiency, solar panels are in many cases installed on rooftops of buildings (e.g., office buildings, houses, etc.). However, because of winds and storms, the mounting fixtures used for installing solar panels on buildings need to be sufficiently strong and durable to reduce the chances of damage or injury from a panel coming loose during a storm, etc.

Various mounting fixtures have been developed for solar panel installation. For example, U.S. Pat. No. 7,963,074 discloses a device for fixing a photovoltaic module on a sloping roof having a roof structure and a roof covering with individual roof covering elements. The device includes a roof-side connecting piece disposable beneath the roof covering and a module-side connecting piece disposable on an edge of the photovoltaic module. A flexible retaining element interconnects the roof-side connecting piece and the module-side connecting piece. The flexible retaining element is loadable by pulling and adapted to be guided through the roof covering without altering a position or shape of the individual roof covering elements.

Despite the existence of such mounting fixtures, further enhancements may be desirable in some applications.

SUMMARY

A system for mounting at least one solar panel on a building may include at least one panel mounting bracket including a base to be positioned on the building, a vertical extension having a proximal end coupled to the base and a distal end vertically spaced apart from the base, and a first lateral extension carried on an exterior surface of the vertical extension. The system may further include an adjustable height extension device for the at least one panel mounting bracket including a lower portion, an upper portion carried by the lower portion to be connected with the at least one solar panel, a second lateral extension carried by the upper portion and vertically aligned with the first lateral extension, and a height adjustment screw including a head carried by the upper portion to set a vertical height of the upper portion.

More particularly, the vertical extension may include spaced apart vertical sidewalls extending vertically upward from the base and defining a cavity therebetween. Furthermore, the upper portion may define a fastener channel therein for receiving a fastener for connection with the at least one solar panel.

The vertical extension may be laterally centered on the base. Additionally, the base may define a plurality of mounting holes on opposing sides of the vertical extension. By way of example, the at least one panel mounting bracket may comprise aluminum. Also, the lower portion, upper portion, and second lateral extension of the adjustable height extension device may also comprise aluminum. A bottom surface of the base may be serrated.

A related adjustable height extension device for a panel mounting bracket, such as the one described briefly above, is also provided.

DETAILED DESCRIPTION

Figure 1:
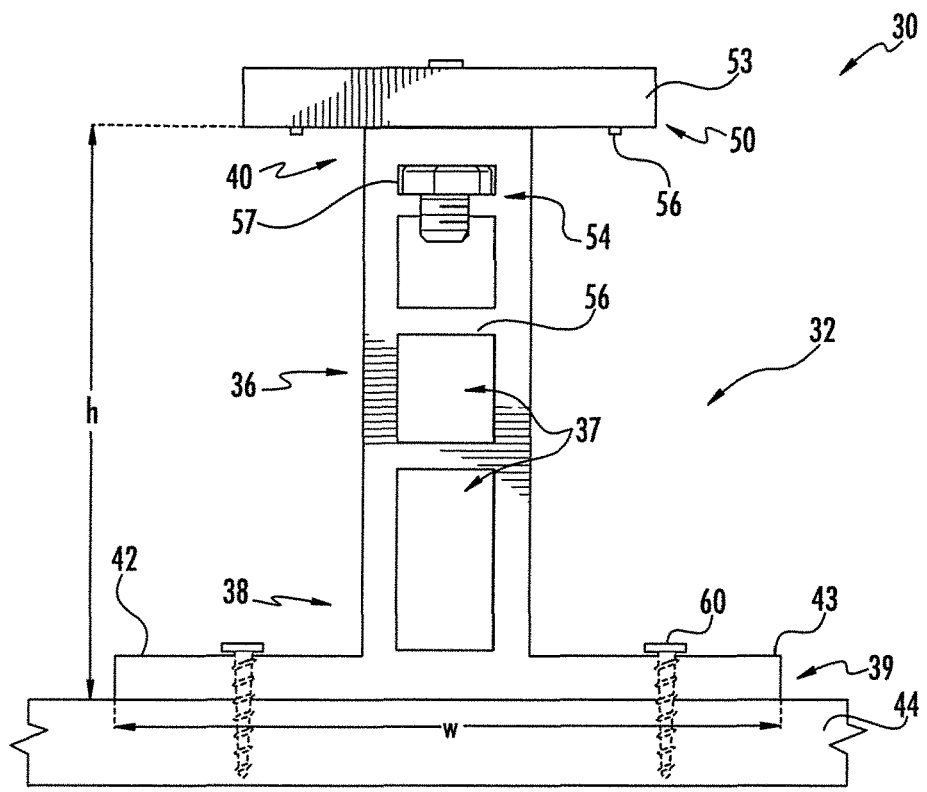
FIG. 1 is an end view of a panel mounting bracket in accordance with an exemplary embodiment of the invention including an under-mounting clamp.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Referring initially to FIGS. 1-8, an assembly 30 for mounting one or more solar panels 31 on a building (e.g., on a roof) is first described. The assembly 30 illustratively includes a mounting bracket 32 (which is also referred to as a "foot" herein) for installing solar panels or modules 31. By way of background, solar modules or panels are typically mounted to racking using clamps that grip the module and hold it tight to rails which are mounted to rooftops by "L" shaped feet. The foot 32 illustrated in FIG. 1 advantageously avoids the need for such rails and clamps by mounting panels to roofs through the use of multiple feet (e.g., four feet, although other numbers of feet may be used), which are attached to the underside of each panel. More particularly, each panel 31 may include an outer frame 33 defining a lip 34 on the underside thereof, and in the example embodiment illustrated in FIGS. 7 and 8 the outer frame carries a photovoltaic cell array 35 therein (although the assembly 30 may also be used for mounting solar hot water heating panels as well, for example).

In the illustrated example, the foot 32 has a generally rectangular-shaped central vertical extension portion 36 with one or more hollow central area(s) or channel(s) 37 therethrough. A proximal end 38 of the vertical extension 36 is coupled to a flange or base 39 of the foot 32, and a distal end 40 of the vertical extension is vertically spaced apart from the proximal end, as seen in FIG. 1. An upper fastener channel slot or groove 41 is defined in the distal end 40 (see FIG. 2), though grooves may instead or in addition be provided on either or both sides of the vertical extension 36 in some embodiments, if desired. The foot 32 has a height h and a width w, which in an example embodiment may both be three inches, but other dimensions may also be used in different embodiments.

The base 39 illustratively includes two side extensions 42, 43 that extend laterally outwardly away from the vertical extension 36 so that the vertical extension is centered on the base (although it need not be centered in all embodiments). Thus, when the bottom surface of the base 39 sits flat on a rooftop or roof deck 44 upon installation, the vertical extension 36 points upward or normal to the surface of the roof (although the vertical extension may form different angles with respect to the base besides 90° in different embodiments). Serrations or other surface features may optionally be included on portions of the upper surface of the distal end 40 and/or the bottom surface of the base 39, if desired. The serrations may advantageously provide for improved electrical grounding with the frame of the panel, as well as increased grip or friction, for example, as will be appreciated by those skilled in the art.

Figure 4:
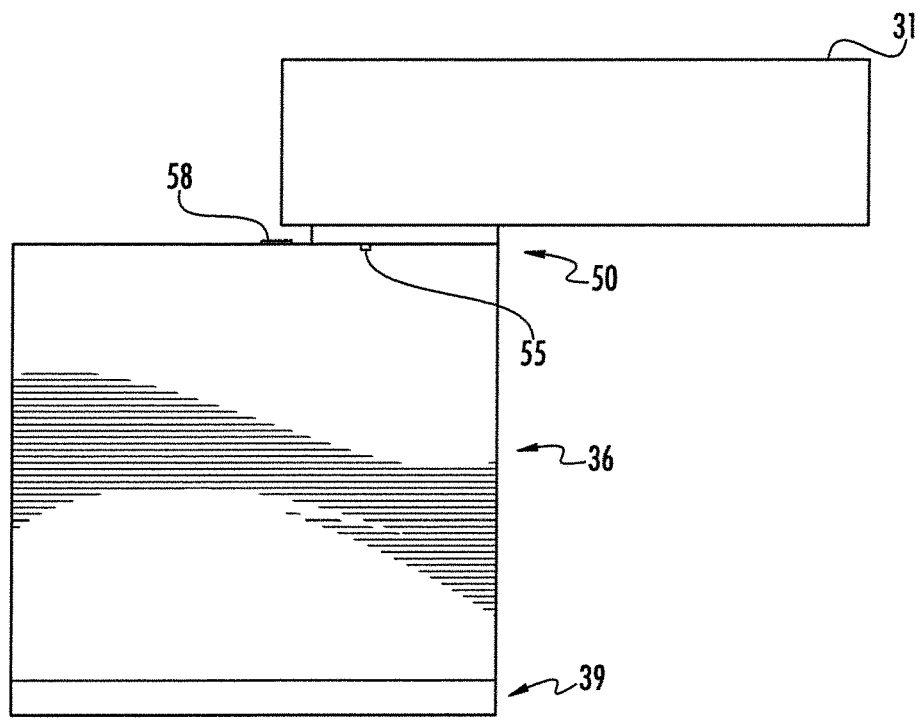
FIG. 4 is a side view of a mounting bracket attached to the frame of the underside of a panel at the perimeter of a panel array.
Figure 5:
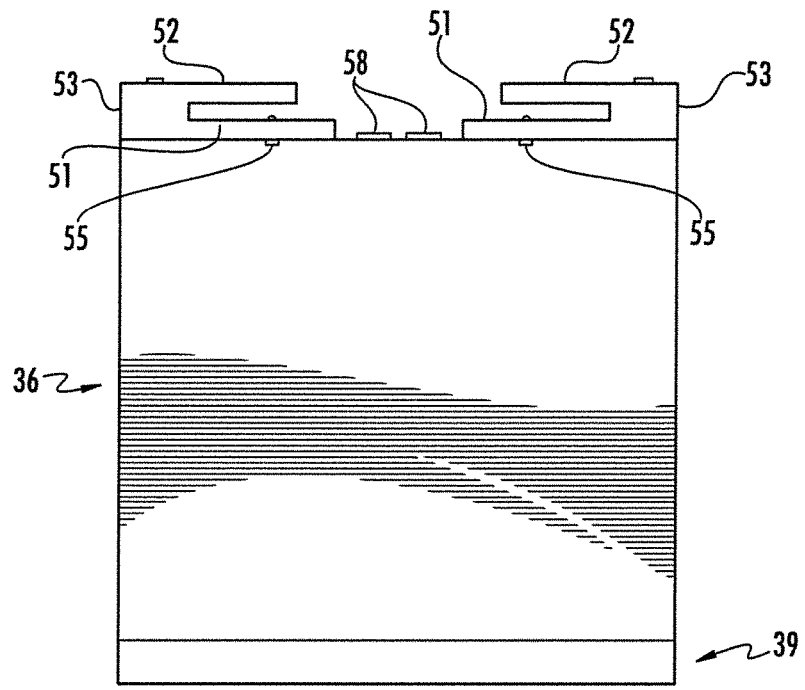
FIG. 5 is a side view of a mounting bracket with two mounting clamps for attaching to respective frames of two adjacent modules.
Figure 6:
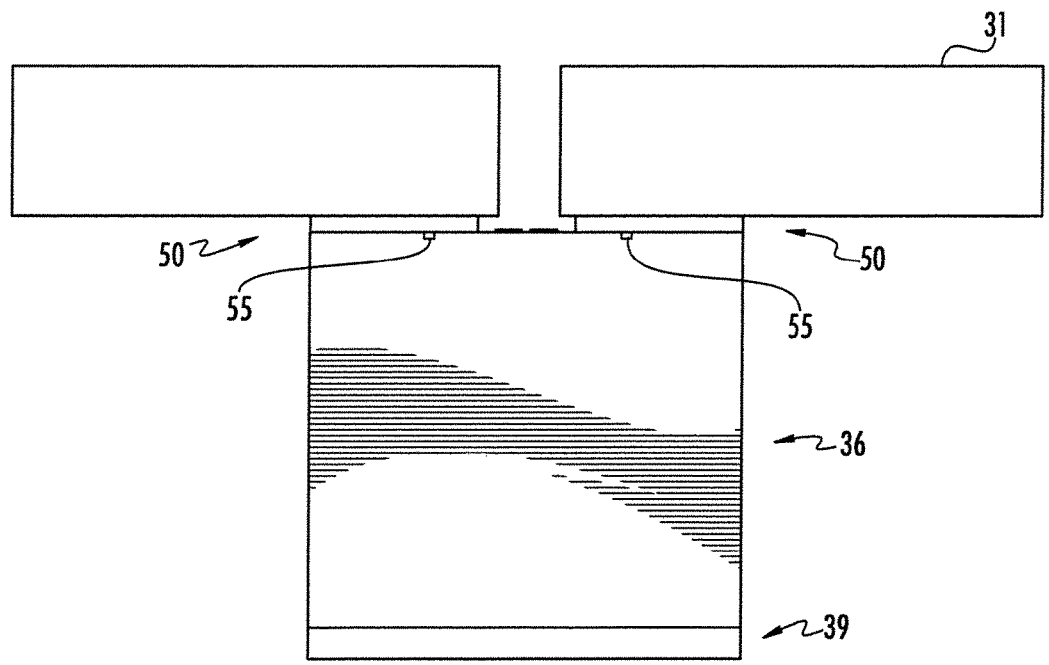
FIG. 6 is an end view of a mounting bracket with two mounting clamps respectively connected to two adjacent modules.
Figure 7:
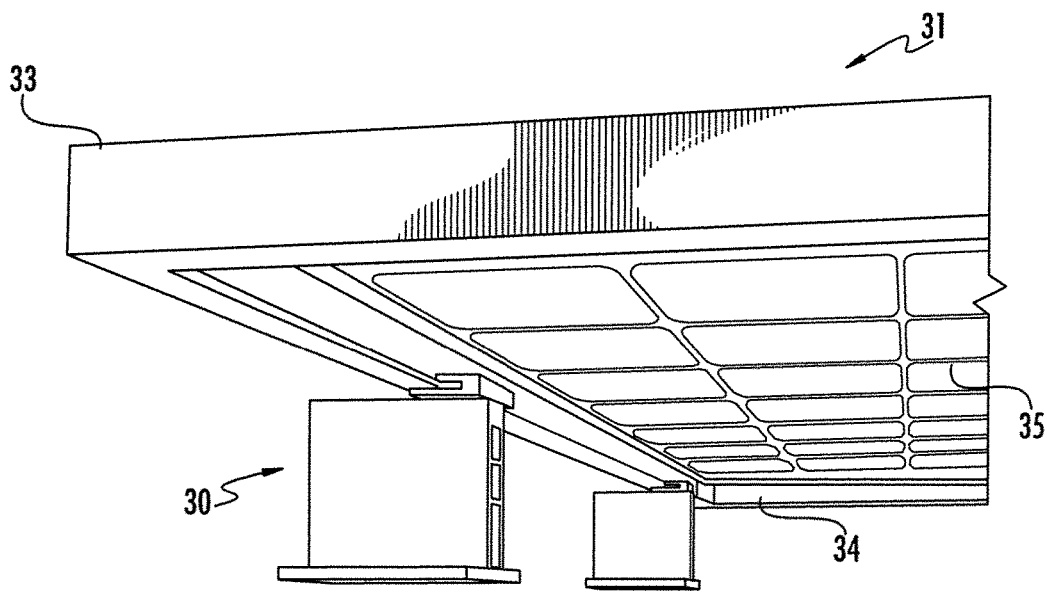
FIG. 7 is a three-dimensional perspective view of a pair of mounting brackets as shown in FIG. 4 each having a respective mounting clamp coupled to a same panel.
Figure 8:
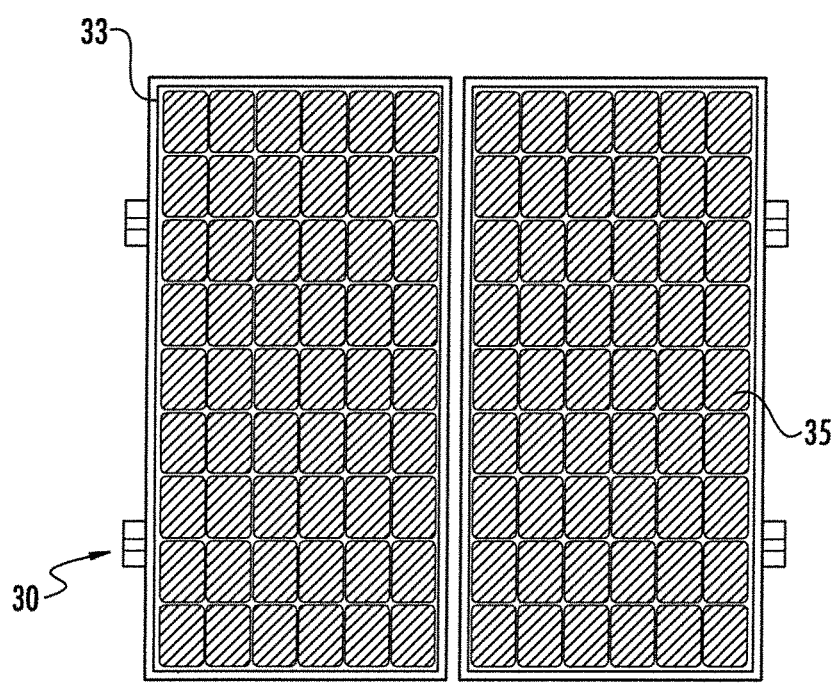
FIG. 8 is a top view of two panels as they would appear installed on a rooftop using a plurality of the bracket assemblies illustrated in FIGS. 4 and 6.

In the illustrated example, the feet 32 are attached to the underside lip 34 of each panel frame 33, as shown in FIGS. 4 and 7. While still on the ground, the installation technician may advantageously attach the feet 32 to the bottom of each panel on their longer sides (e.g., top and bottom sides) with the front edge of the foot facing out from the panel using an under-mounting clamp 50. However, the feet 32 may be attached to the other sides of the panels 31 as well in some embodiments, and the panels may also be attached to the feet after the feet have been installed on the rooftop 44, if desired.

The mounting clamp 50 illustratively includes a bottom flange 51, a top flange 52 spaced apart from the bottom flange and partially overhanging the bottom flange (see FIG. 3) to define a slot therebetween, and an end extension 53 coupling respective ends of the bottom flange and top flange together. The slot is configured to engage or receive the lip 34 of the solar panel 31, as seen in FIG. 7. The mounting clamp 50 further illustratively includes a fastener channel connector 54 coupled to the bottom flange 51 and configured to be slidably received within the fastener channel 41.

Figure 2:
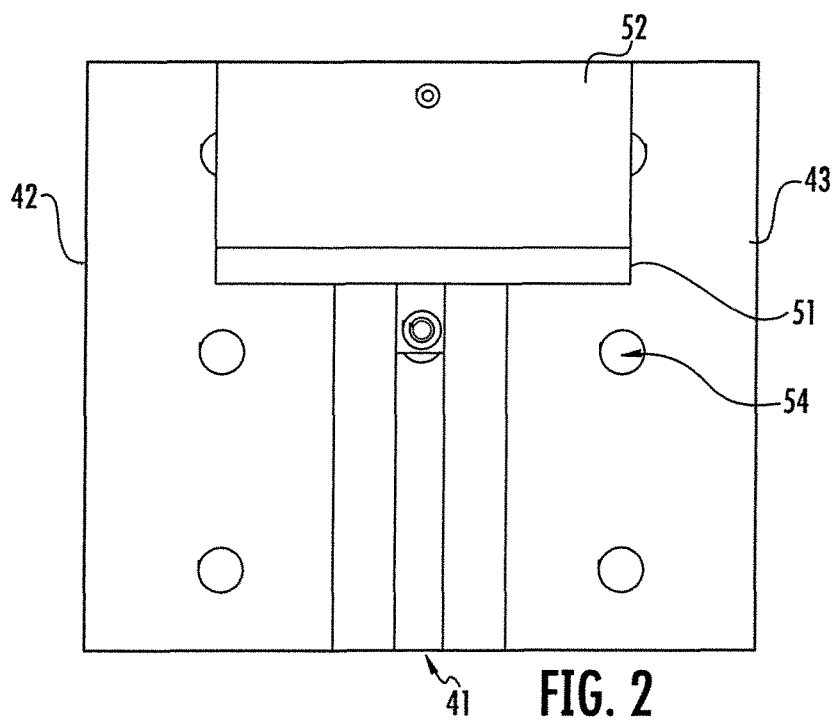
FIG. 2 is a top view of the mounting bracket of FIG. 1 with mounting holes for securing the bracket to a structure.
Figure 3:
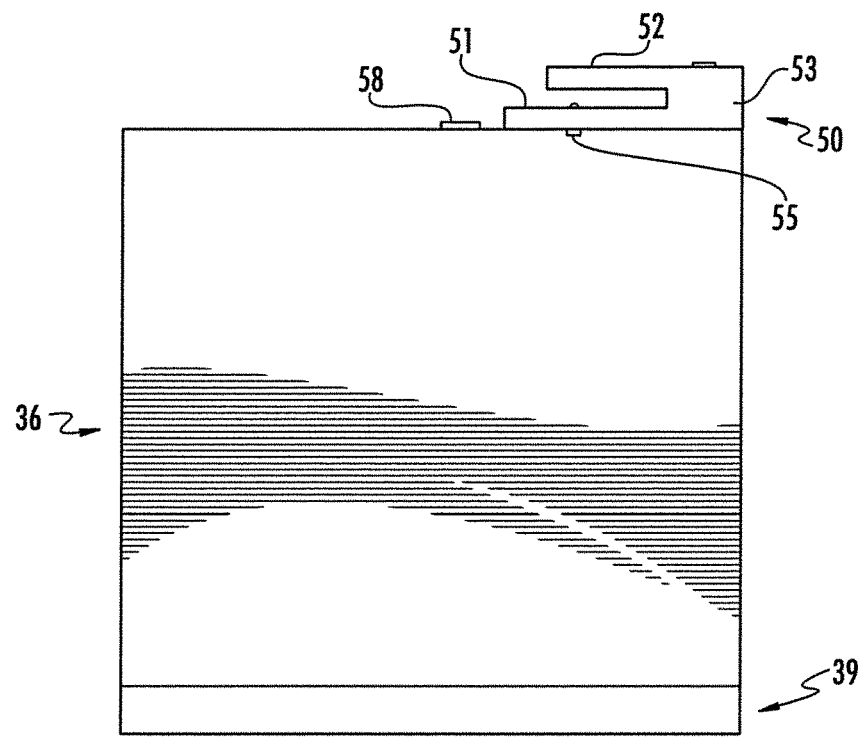
FIG. 3 is a side view of the mounting bracket with a single mounting clamp for attaching to the exterior sides of panels located at the perimeter of a panel array.

In the present example, the fastener channel connector 54 illustratively includes a T-shaped connector or slide bar coupled to the bottom flange 51 on a side thereof opposite the top flange 52 (i.e., on its bottom side). The T-shaped connector 57 is configured to be slidably received within the fastener channel 41, as seen in FIGS. 1 and 2. The fastener channel connector 54 may first be attached to the solar panel 31, and then the feet 32 connected to respective mounting clamps 50. Another approach is that the mounting clamps 50 may be coupled to respective feet 32, and the entire assembly 30 (i.e., mounting clamp plus foot) may then be connected to the solar panel 31. The mounting clamp 50 further illustratively includes a retaining set screw(s) 55 which may be tightened to secure the lip 34 within the slot between the bottom and top flanges 51, 52, and a slide bar retaining bolt 58 and a corresponding nut 59.

A first row of panels 31 may then be attached on the roof 44 with deck screws 60 through mounting holes 61 in the side extensions 42, 43 on the outward or perimeter side of the array, typically in a straight line. In some instances, a sealant may be used under each foot 32, if desired. Various types of sealant may be used, such as caulking, tar, Butyl tape, etc. An adjacent row of solar panels 31 may then be attached with additional feet 32 adjacent to the first row of solar panels so as to share the second set of feet (see FIGS. 5 and 6) between them. That is, the fastener channel 41 of each vertical extension portion may be of sufficient dimensions or length to slidably receive two (or more) fastener channel connectors 54 therein. While the feet 32 are shared between adjacent panels, the mounting clamps 50 retain each solar panel 31 independently. This allows each solar panel 31 to be installed and secured individually, and in the event that a solar panel is to be removed from an array, this can be done independently without loosening the adjacent solar panel, which is generally not possible with typical panel or panel mounting arrangements.

The installation process may be repeated for each row of solar panels 31 to be installed, until the last row of solar panels is reached. On the outer perimeter of the last solar panel 31, one mounting clamp 50 may be used per foot 32 to attach to the outer edge of each of the perimeter solar panels (see, e.g., FIGS. 4 and 7).

A significant advantage of the assembly 30 is that it may advantageously be connected or coupled to a respective solar panel 31 on the ground, rather than having to be coupled to the solar panel on the roof 44 where this is more difficult (and potentially more dangerous), and where it is much harder to recover dropped tools, screws, nuts, washers, or other parts. Moreover, this may also help expedite the installation process.

The hollow channels or passageways 37 in the vertical extension 36 may serve as wire management channels, which may be used for keeping electrical transmission wires (e.g., for PV panels) or temperature sensor wires (e.g., for a water heater panels) secured in place. However, the cross-support members 56 which define the channels 37 need not be included in all embodiments, although even when the channels are not used for routing wires the cross-support members may provide added rigidity and/or stability to the feet 32. It should also be noted that the vertical extension 36 of the foot 32 need not be hollow in all embodiments, and that different shapes beside a rectangular shape may also be used for the base 39 and/or the vertical extension in some embodiments. Example materials for the foot 32 and the mounting clamp 50 may include aluminum, which may be extruded into the desired shape, although other suitable materials may also be used in different embodiments. The various screws and fasteners described herein may be stainless steel, brass, galvanized steel, etc.

Here again, a sealant may optionally be used under each foot 32 so that the screws 60 are screwed through the foot 32 and sealant into the roof or decking 44 at desired locations. By way of example, two or more feet 32 may be secured to the roof 44 to receive one side of the panel, i.e., two (or more) feet are used on each of the top and bottom sides or edges of the solar panel 31, as shown in FIG. 7, although in some embodiments a single foot may be used.

It should be noted that the above-described mounting assembly 30 may be used with a variety of roof types, including flat and sloped roofs, and over different types of roof coverings (e.g., shingles, tiles, panels, etc.). Moreover, the mounting feet may be used for installations other than on rooftops, such as where mounting to the side of a building or other structure is required.

Figure 9:
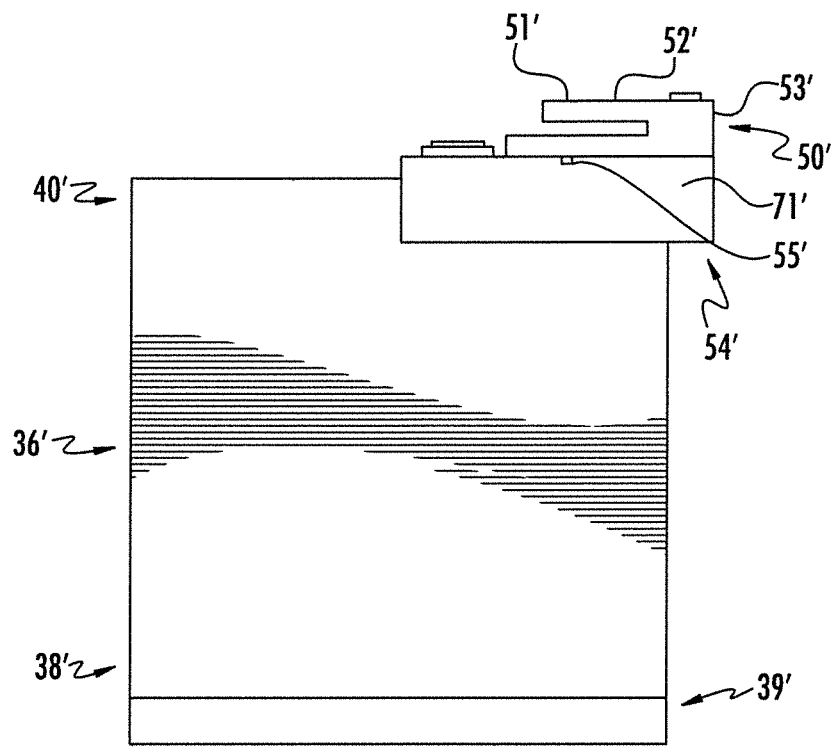
FIGS. 9-11 are respective side, end, and perspective illustrations of another example mounting bracket assembly which includes another example fastener channel connector configuration.
Figure 10:
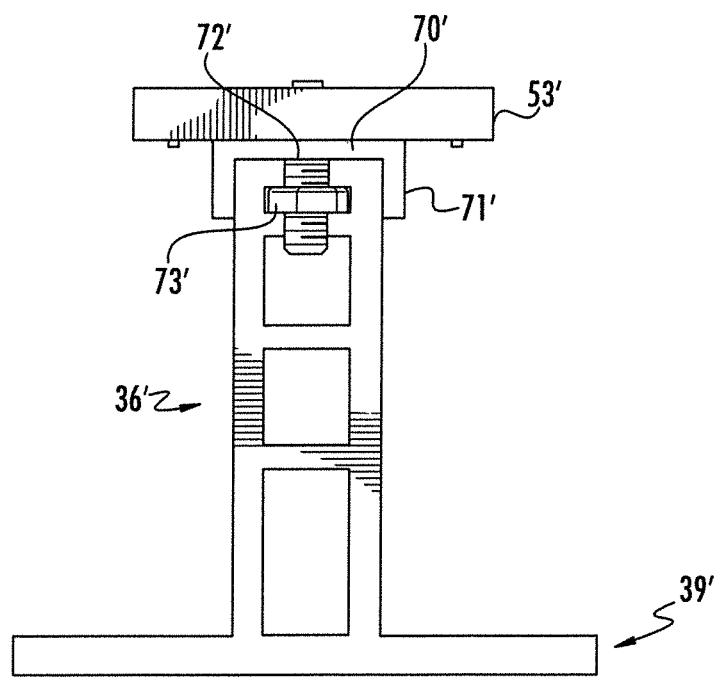
Figure 11:
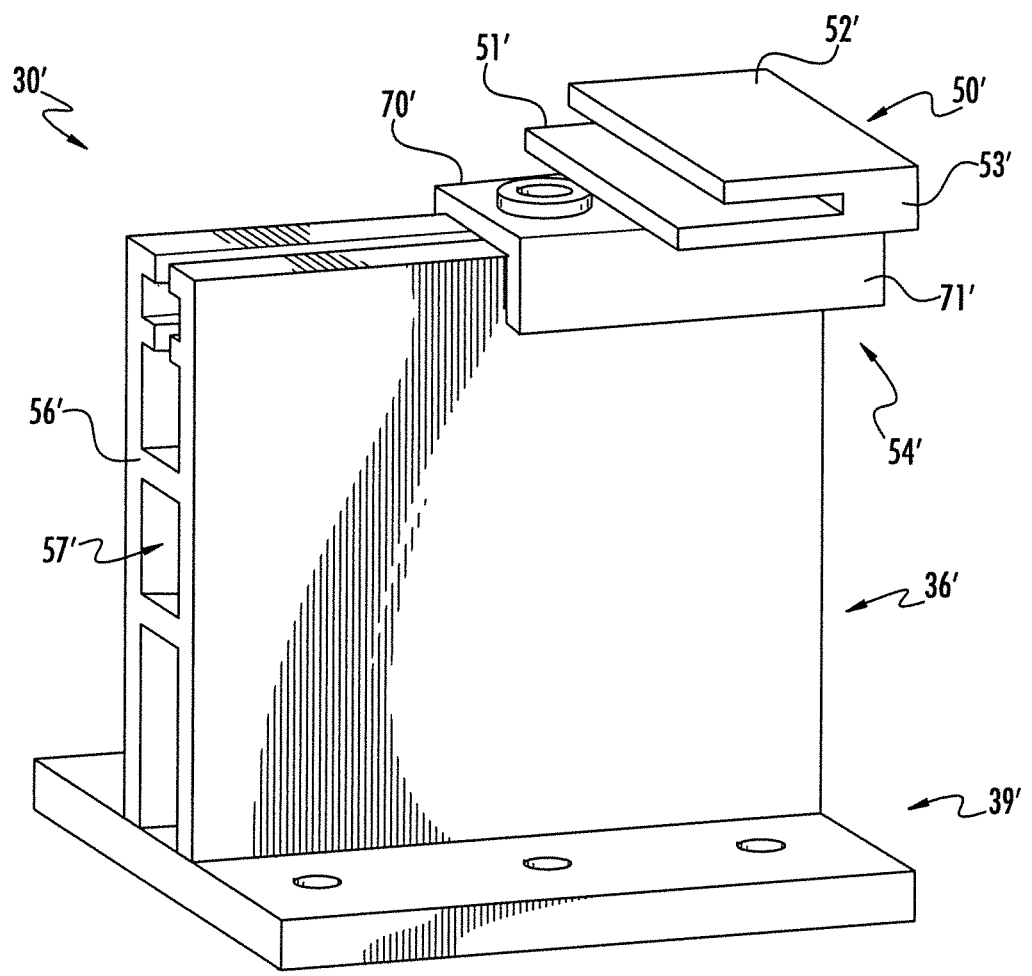

In accordance with another example embodiment now described with reference to FIGS. 9-11, the fastener channel connector 54' may in this configuration include a horizontal base or platform member 70' having an upper surface coupled to the mounting clamp 50' and a lower surface positioned on the distal end 40' of the vertical extension 36', instead of the slide bar configuration shown in FIG. 1. A pair of spaced apart vertical side members 71' are coupled to opposite sides of the horizontal member 70' and extend along the distal end 40' of the vertical extension 36' when the lower surface of the horizontal member is positioned on the distal end of the vertical extension 36'. Stated alternatively, this configuration generally has an inverted "U" shape (as seen from the end view of FIG. 10) defining a channel that fits on the distal end 40' of the vertical extension 36'. A bolt 72' is coupled to the horizontal member 70' and configured to extend downward into the fastener channel 41' when the lower surface of the horizontal member is positioned on the distal end 40' of the vertical extension 36', and a nut 73' may be screwed onto the bolt and configured to be slidably received within the fastener channel.

In the present example, the fastener channel connector 54' allows for the mounting clamp 50' of each independent solar panel to remain attached to that solar panel, but yet be removed from the corresponding mounting bracket 32', allowing each solar panel to be detached from its mounts by removing each retaining bolt 72' and nut 73'. This facilitates the removal of solar panels independent from other panels within the array without the disruption of adjacent panels, which again may not be possible with typical mounting systems.

In another example embodiment, the above-described assembly 30 may be used for mounting solar panels without an outer frame (i.e., a frameless panel or module). That is, the mounting clamps 50 could be coupled directly to the photovoltaic cell array 35, by directing the slot between the bottom and top flanges 51, 52 inward to receive the cell array panel therein (as opposed to the slots facing outward to receive the outer frame lip 34 as described above). To this end, a material such as rubber, etc., may be positioned or adhered within the slot to help protect and/or securely hold the cell array 35. Moreover, the set screw 55 may still be used to secure the cell array 35 within the slot, and in some configurations a small plate (e.g., stainless steel plate, etc.) may be coupled to or actuated by the set screw to be pressed into contact to secure the cell array within the slot, as will be appreciated by those skilled in the art. This may be beneficial to help keep the glass substrate upon which the cell array 35 is formed from cracking, for example.

Figure 12:
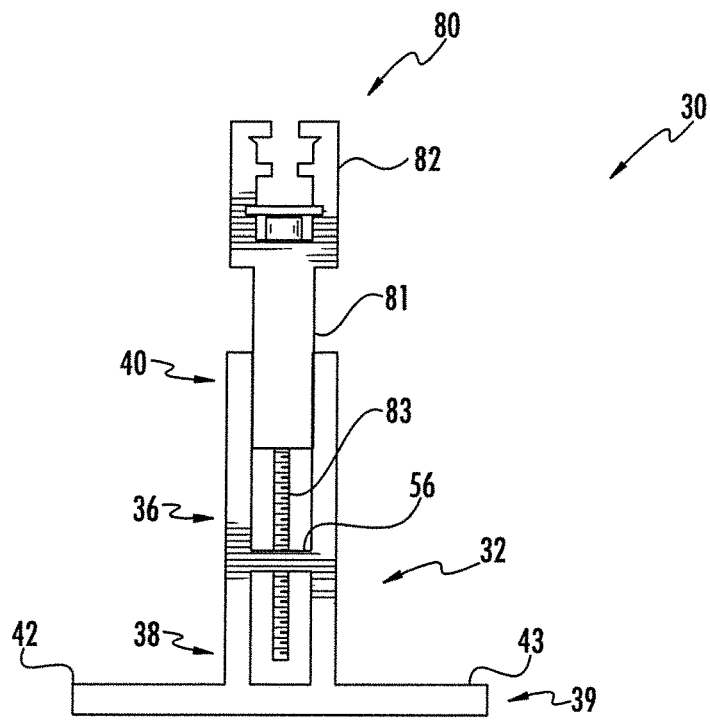
FIG. 12 is an end view of a panel mounting bracket assembly in accordance with another exemplary embodiment including an internal height adjustment device.

Turning now to FIGS. 12-15, in accordance with another example embodiment of the panel mounting assembly 30, an adjustable height extension device 80 may optionally be coupled to the vertical extension 36 of the foot 32 (or other suitable panel mounting bracket) for use during the installation process to more easily install and level panels where roofs or other portions of a building are not flat or even, for example. More particularly, in the present example, the adjustable height extension device 80 illustratively includes a lower portion or body 81 which rests or is mounted inside the channel or cavity within the vertical extension portion 36. Moreover, an upper or head portion 82 is carried on top of the lower portion 81, and it is wider than the lower portion, as seen in FIG. 12. That is, the upper portion 82 is wider than the channel within the vertical extension 36 of the foot, so that the bottom of the upper portion defines a lower limit to the range of height adjustment, while the bottom of the lower portion 81 defines the upper limit of height adjustment (i.e., the point at which it will come out of the vertical extension).

The height of the adjustable height extension device 80 may be adjusted up and down by the use of a height adjusting screw 83, for example, which extends down through the upper and lower portions 82, 81 and is secured into the cross-support member 56 of the vertical extension 36, which may be tapped to receive the height adjustment screw, for example. As a head of the screw 83 is turned, this causes a shaft of the screw to rotate within the cross-support member 56, whereby the lower portion 81 slides vertically up or down within the cavity of the vertical extension 36 between the sidewalls thereof and the upper portion 82 moves up or down. One or more guides or set screws 84 may be threaded into and through the sides of the vertical extension, and optionally through oblong holes of the lower portion 81 of the adjustable height extension device 80, to sturdy the extension when it is at height. That is, the guides 84 may extend all the way laterally through the lower portion 81 in some embodiments, or may be tightened against the side of the lower portion in other embodiments, to hold it at the desired height.

Figure 13:
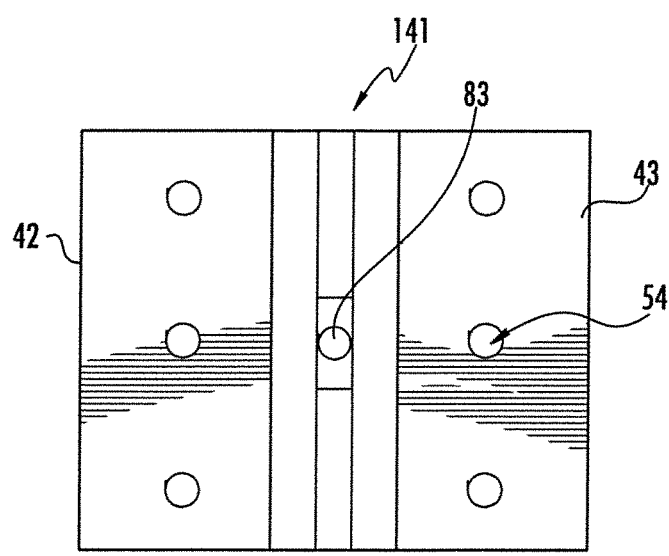
FIG. 13 is a top view of the mounting bracket assembly of FIG. 12 with mounting holes for securing the bracket to a structure.
Figure 14:
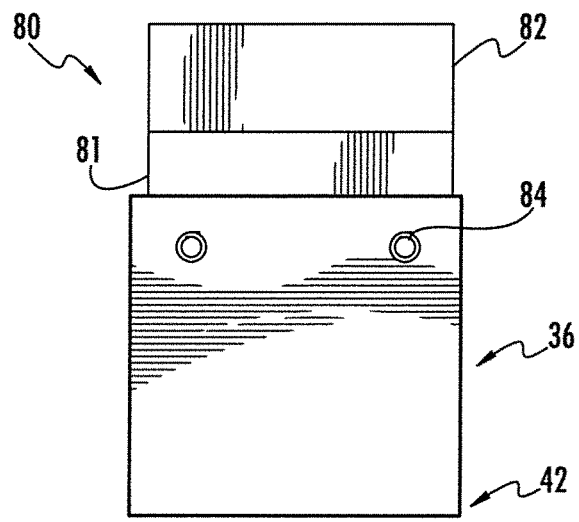
FIG. 14 is a side view of the mounting bracket assembly of FIG. 12.
Figure 15:
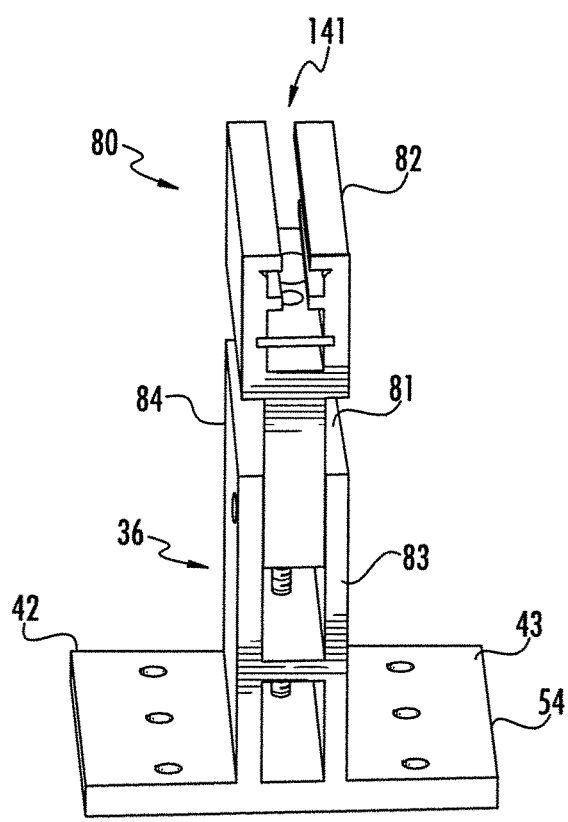
FIG. 15 is a perspective view of the mounting bracket assembly of FIG. 12.

The adjustable height extension device 80 may be adjusted with a tool (e.g., a screw driver, Alan wrench, star wrench, etc.) which fits down through a fastener channel 141 in the upper portion 81, as seen in FIG. 13, which may serve the same function as the fastener channel 41 described above for connecting to the under-mounting clamp 50. However, the fastener may be connected directly to a solar panel in embodiments where the under-mounting clamp is not used.

Figure 16:
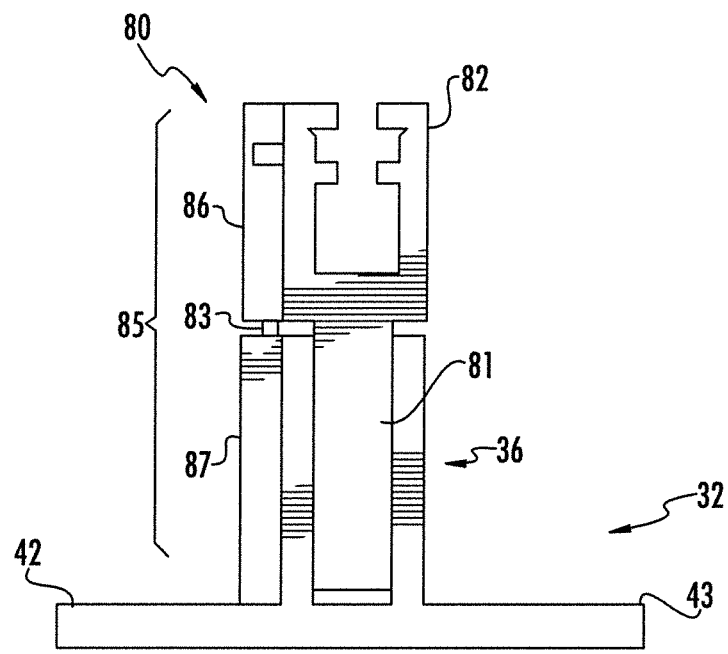
FIG. 16 is an end view of another embodiment of the mounting bracket assembly of FIG. 12, but with an external height adjustment device on the side of the upper extension and base.
Figure 17:
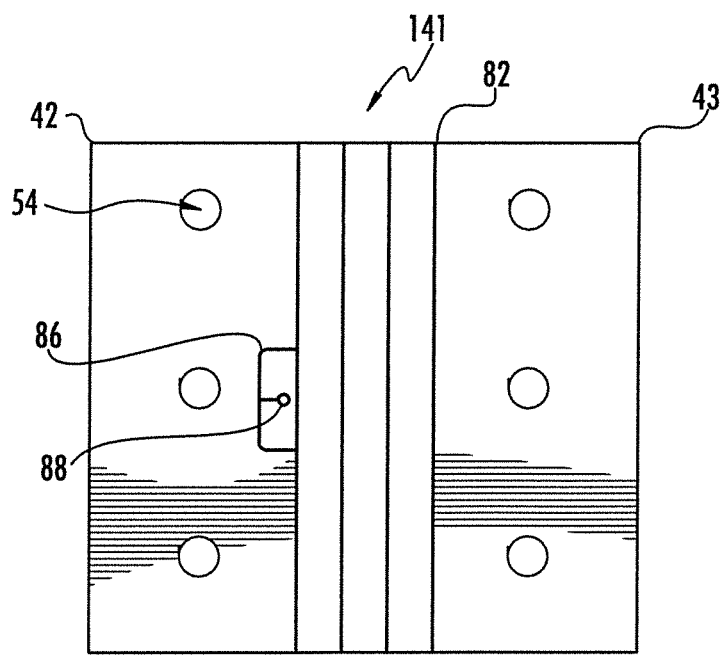
FIG. 17 is a top view of the panel mounting bracket assembly of FIG. 16.
Figure 18:
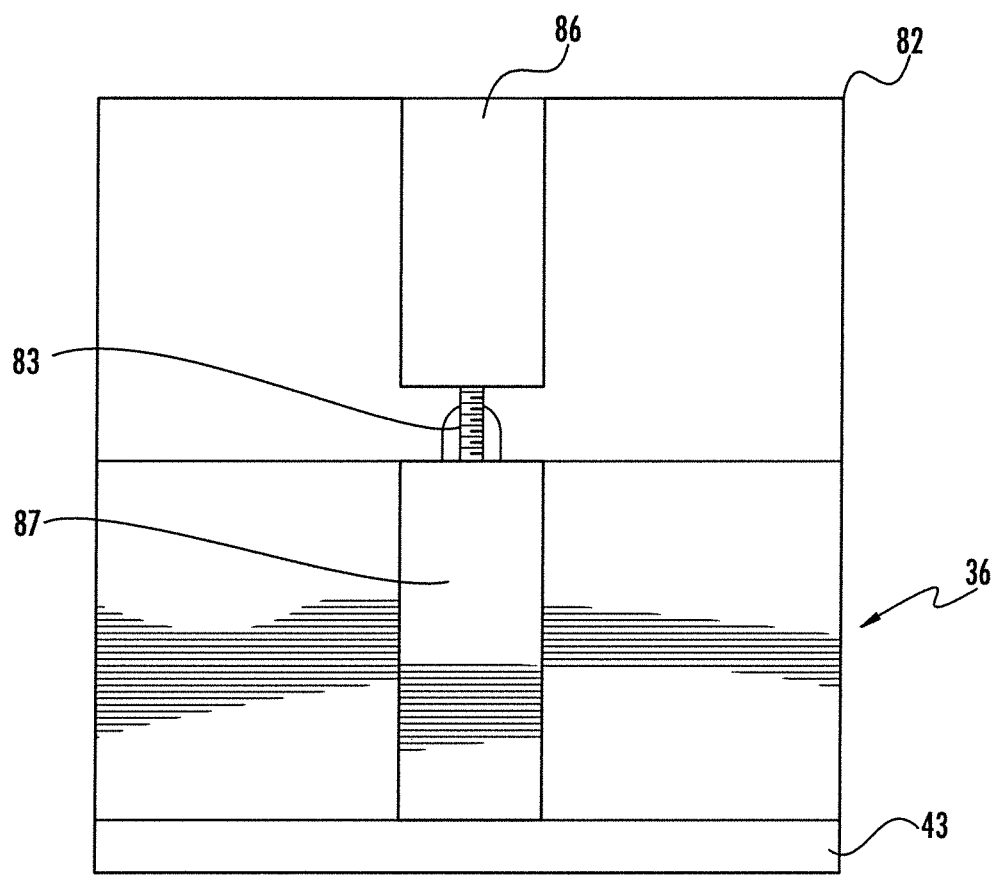
FIG. 18 is a side view of the panel mounting bracket assembly of FIG. 16.

Turning now additionally to FIGS. 16-18, in another example embodiment the adjustable height extension device 80 may similarly include a lower portion 81 which is received in the cavity of the vertical extension 36 and an upper portion 82 on the lower portion, but in this configuration an adjustment assembly 85 is exterior to the vertical extension 36, rather than within it. More particularly, the adjustment mechanism illustratively includes a chamfered upper block 86 attached to the upper portion 82, and a threaded lower block 87 attached to the side of the vertical extension 36 of the foot 32 and vertically aligned with the upper block. In this configuration the height may be adjusted up and down by the use of a tool (e.g., screwdriver, Alan wrench, star wrench, etc.) which extends through a hole 88 in the top of the upper block 86 and into the head of the height adjustment screw 83 which is encapsulated in the upper block and is threaded into the lower block 87, which again is attached to the side of the vertical extension 36.

As with the interior located height adjustment screw 83 described above, the exterior-located version may have one or more guides 84 (not shown in FIGS. 16-17) threaded into and through the sides of the vertical extension 36 and through oblong holes in the lower portion 81 to sturdy the adjustable height extension device 80 when it is at height or vertically extended. Here again, the guides may just be set screws that apply pressure to the side of the lower portion 81 to hold it in place as well.

The various configurations of the adjustable height extension device 80 may be constructed of similar materials to that of the foot 32 (e.g., aluminum, etc.). It should also be noted that the above-described panel mounting assemblies may be implemented with a seam channel to accommodate standing seams on a standing seam roof, as described further in U.S. Pat. No. 9,145,685 to Stapleton, which is hereby incorporated herein in its entirety by reference.

Many modifications and other embodiments of the invention will come to the mind of one skilled in the art having the benefit of the teachings presented herein. For example, in addition to eyeglasses, the above-described approach may be used with other wearable accessories, such as watches, bracelets, etc. Therefore, it is understood that the invention is not to be limited to the specific exemplary embodiments disclosed herein.

That which is claimed is:

1. A system for mounting at least one solar panel on a building, the system comprising:
    at least one panel mounting bracket comprising
        a base to be positioned on the building,
        a vertical extension having a proximal end coupled to the base and a distal end vertically spaced apart from the base, and
        a first lateral extension carried on an exterior surface of the vertical extension; and
    an adjustable height extension device for the at least one panel mounting bracket comprising
        a lower portion,
        an upper portion carried by the lower portion to be connected with the at least one solar panel,
        a second lateral extension carried by the upper portion to be vertically aligned with the first lateral extension, and
        a height adjustment screw including a head carried by the upper portion to set a vertical height of the upper portion;
    wherein the first lateral extension defines a stop limiting vertical travel of the second lateral extension, and wherein the upper portion defines a fastener channel therein for receiving a fastener for connection with the at least one solar panel.

2. The system of claim 1 wherein the vertical extension comprises spaced apart vertical sidewalls extending vertically upward from the base and defining a cavity therebetween.

3. The system of claim 1 wherein the vertical extension is laterally centered on the base.

4. The system of claim 1 wherein the base defines a plurality of mounting holes on opposing sides of the vertical extension.

5. The system of claim 1 wherein the at least one panel mounting bracket comprises aluminum.

6. The system of claim 1 wherein the lower portion, upper portion, and second lateral extension of the adjustable height extension device comprise aluminum.

7. The system of claim 1 wherein a bottom surface of the base is serrated.

8. A system for mounting at least one solar panel on a building, the system comprising:
    at least one panel mounting bracket comprising
        a base to be positioned on the building,
        a vertical extension having a proximal end coupled to the base and a distal end vertically spaced apart from the base, the vertical extension comprising spaced apart vertical sidewalls extending vertically upward from the base and defining a cavity therebetween, and
        a first lateral extension carried on an exterior surface of the vertical extension; and
    an adjustable height extension device for the at least one panel mounting bracket comprising
        a lower portion,
        an upper portion carried by the lower portion to be connected with the at least one solar panel,
        a second lateral extension carried by the upper portion and to be vertically aligned with the first lateral extension, and
        a height adjustment screw including a head carried by the upper portion to set a vertical height of the upper portion;
    wherein the base defines a plurality of mounting holes on opposing sides of the vertical extension;
    wherein the first lateral extension defines a stop limiting vertical travel of the second lateral extension, and wherein the upper portion defines a fastener channel therein for receiving a fastener for connection with the at least one solar panel.

9. The system of claim 8 wherein the vertical extension is laterally centered on the base.

10. The system of claim 8 wherein the at least one panel mounting bracket comprises aluminum.

11. The system of claim 8 wherein the lower portion, upper portion, and second lateral extension of the adjustable height extension device comprise aluminum.

12. The system of claim 8 wherein a bottom surface of the base is serrated.

13. An adjustable height extension device for a panel mounting bracket for mounting at least one solar panel on a building, the panel mounting bracket comprising at least one panel mounting bracket comprising a base to be positioned on the building, a vertical extension having a proximal end coupled to the base and a distal end vertically spaced apart from the base, and a first lateral extension carried on an exterior surface of the vertical extension, the adjustable height extension device comprising:
    a lower portion;
    an upper portion carried by the lower portion to be connected with the at least one solar panel;
    a second lateral extension carried by the upper portion to be vertically aligned with the first lateral extension; and
    a height adjustment screw including a head carried by the upper portion to set a vertical height of the upper portion;

wherein the first lateral extension defines a stop limiting vertical travel of the second lateral extension, and wherein the upper portion defines a fastener channel therein for receiving a fastener for connection with the at least one solar panel.

14. The adjustable height extension device of claim 13 wherein the vertical extension comprises spaced apart vertical sidewalls extending vertically upward from the base and defining a cavity therebetween.

15. The adjustable height extension device of claim 13 wherein the vertical extension is laterally centered on the base.

16. The adjustable height extension device of claim 13 wherein the base defines a plurality of mounting holes on opposing sides of the vertical extension.

17. The adjustable height extension device of claim 13 wherein the at least one panel mounting bracket comprises aluminum.

18. The adjustable height extension device of claim 13 wherein the adjustable height extension device comprises aluminum.

19. The adjustable height extension device of claim 13 wherein a bottom surface of the base is serrated.

20. A system for mounting at least one solar panel on a building, the system comprising:
   at least one panel mounting bracket comprising
      a base to be positioned on the building,
      a vertical extension having a proximal end coupled to the base and a distal end vertically spaced apart from the base, and
      a first lateral extension carried on an exterior surface of the vertical extension; and
   an adjustable height extension device for the at least one panel mounting bracket comprising
      a first portion,
      a second portion carried by the first portion to be connected with the at least one solar panel,
      a second lateral extension carried by the second portion to be vertically aligned with the first lateral extension, and
      a height adjustment screw including a head carried by the second portion to set a vertical height of the second portion;
   wherein the first lateral extension defines a stop limiting vertical travel of the second lateral extension, and wherein the second portion defines a fastener channel therein for receiving a fastener for connection with the at least one solar panel.

21. The system of claim 20 wherein the vertical extension comprises spaced apart vertical sidewalls extending vertically upward from the base and defining a cavity therebetween.

22. The system of claim 20 wherein the vertical extension is laterally centered on the base.

23. The system of claim 20 wherein the base defines a plurality of mounting holes on opposing sides of the vertical extension.

24. The system of claim 20 wherein the at least one panel mounting bracket comprises aluminum.

25. The system of claim 20 wherein the first portion, second portion, and second lateral extension of the adjustable height extension device comprise aluminum.

26. The system of claim 20 wherein a bottom surface of the base is serrated.

* * * * *